United States Patent [19]

Fiedler et al.

[11] 4,189,846
[45] Feb. 26, 1980

[54] PROCESS FOR THE CONTINUOUS PRODUCTION OF SOLIDS, IN PARTICULAR PROTEIN CONCENTRATES, FROM AQUEOUS SOLUTIONS, AND APPARATUS FOR THE PRACTICE OF THE PROCESS

[75] Inventors: Jürgen Fiedler, Nettetal; Klaus Fricke, Krefeld-Gartenstadt, both of Fed. Rep. of Germany

[73] Assignee: GEFI Gesellschaft fur Industriewarme und Verfahrenstechnik mit Beschrankter Haftung, Krefeld, Fed. Rep. of Germany

[21] Appl. No.: 880,554

[22] Filed: Feb. 23, 1978

[30] Foreign Application Priority Data

Feb. 23, 1978 [DE]  Fed. Rep. of Germany ....... 2707668

[51] Int. Cl.$^2$ ........................... A23J 1/06; F26B 5/08
[52] U.S. Cl. ........................................ 34/8; 34/57 R; 260/112 B
[58] Field of Search ................... 260/112 B; 424/101; 34/8, 12

[56] References Cited

U.S. PATENT DOCUMENTS

| 3,123,593 | 3/1964 | Allan et al. | 260/112 B |
| 3,450,537 | 6/1969 | Filstrup | 260/112 B X |
| 3,615,651 | 10/1971 | Parks | 260/112 B X |

*Primary Examiner*—Walter C. Danison
*Attorney, Agent, or Firm*—Herbert E. Kidder

[57] ABSTRACT

A process for continuously producing dried protein concentrates, namely blood meal, from an aqueous solution of animal blood, in which the solution is atomized in superheated steam at a temperature of about 400° C. The atomization of the solution is accomplished, at least in part, by a centrifugal atomizer that throws the solution radially outward in an extremely thin layer of finely divided droplets having diameters less than 100 microns. The small droplets pass into the stream of superheated steam, which causes the liquid to evaporate, and the dried blood solids to precipitate to the bottom of the collector where they are discharged by a conveyor. The superheated steam, which was cooled to about 200° C. by the drying process, goes to a cyclone separator which removes any entrained solids, and is then returned to the heat exchanger, where it is again heated to about 400° C. for re-use in the process.

1 Claim, 1 Drawing Figure

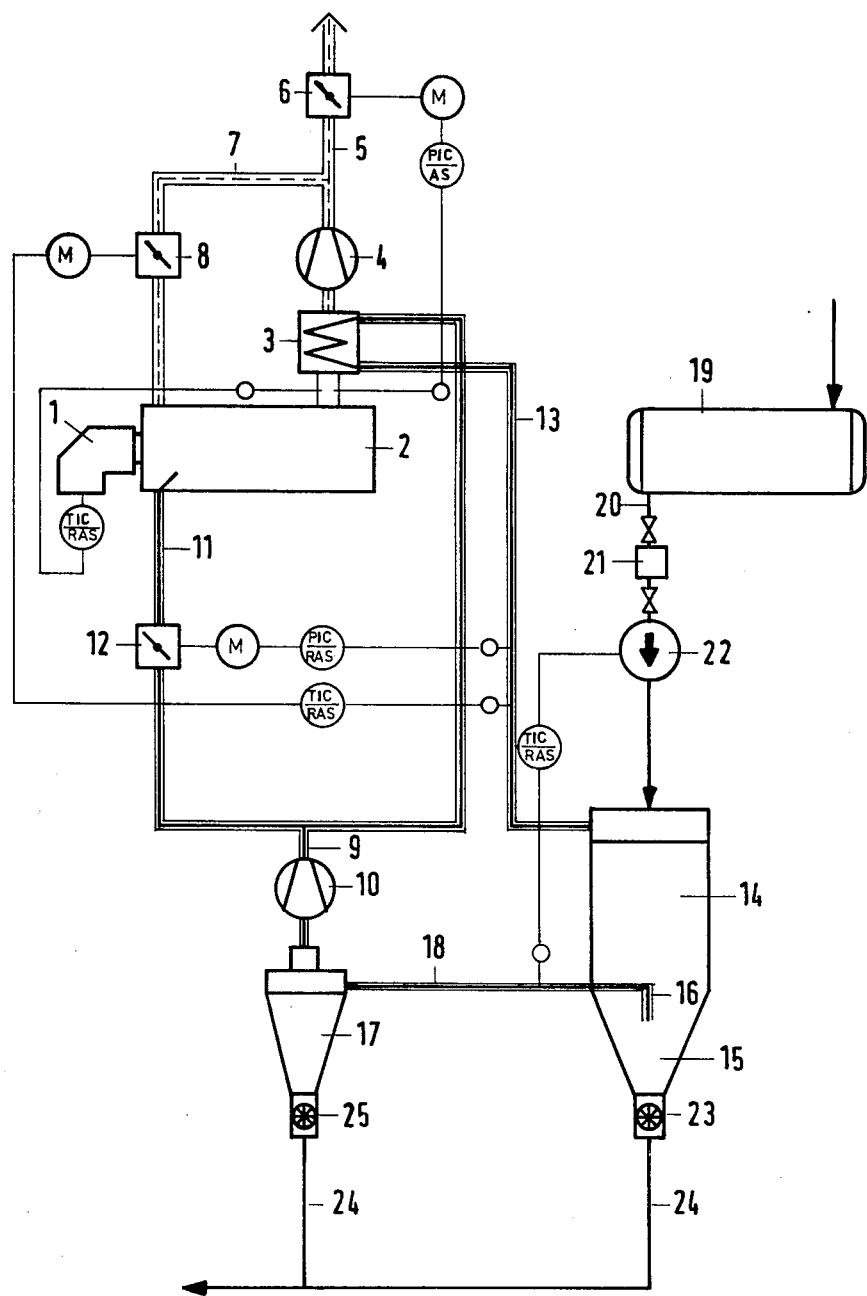

PROCESS FOR THE CONTINUOUS PRODUCTION OF SOLIDS, IN PARTICULAR PROTEIN CONCENTRATES, FROM AQUEOUS SOLUTIONS, AND APPARATUS FOR THE PRACTICE OF THE PROCESS

BACKGROUND OF THE INVENTION

The invention pertains to a process for the continuous production of solids, especially protein concentrates, from aqueous solutions, in particular blood, the solution being brought in contact with superheated steam.

Protein concentrates from aqueous solutions, in particular so-called blood meal from animal blood, are used for a variety of purposes. Thus blood concentrates made from animal blood in the form of the so-called blood albumin is an important raw material in the production of binders. Besides, dried blood meal is being used more and more frequently to feed animals or as nitrogen-containing fertilizer in agriculture and horticulture. Because it must be assumed that the animal blood carries microorganisms, regulations have been decreed which specify that the blood must be sterilized before or during processing, in order thereby to supress the spread of pestilences and diseases.

In a known process of the kind described above, the animal blood is sterilized by admission of steam at a temperature of about 130° C., and is caused to coagulate at the same time. Then, the separated serum is centrifuged and the residual substance is dried.

Apart from the fact that a biological decomposition of the blood occurs due to the steam treatment, which takes about 30 minutes, and that the drying leads to an undesirable pollution of the environment by unpleasant odors, the known process has the further disadvantage that the separated serum cannot be discharged into the sewer system directly, but must first be processed.

SUMMARY OF THE INVENTION

It is the object of the invention to provide a process of the above-described kind and an apparatus for the practice of the process, which operate more economically and with better yield.

This problem is solved in the process, in that the solution is atomized in superheated "hot" steam and dried, and that the resulting protein concentrate is collected and removed and the cooled "hot" steam is superheated again and returned to the process at least partly.

By atomization of the solution, very large contact surfaces between the material and superheated steam and hence high drying rates can be produced. This is especially true when the solution is atomized in a centrifugal atomizer and spreads under the action of the centrifugal force in an extremely thin layer which, as soon as it gets into the superheated steam, dissolves as a fog. Higher moisture concentration causes the steam to cool off, with simultaneous drying of the solution. In any event, the energy consumption remains low, as the vapors used for drying are recycled. This eliminates the nuisance created by odor. Discharged vapors contain no gas or gas mixture, and can be burned in the course of thermal aftercombustion.

Another advantage of the process of the invention is that there is no waste water, and therefore the cost of waste water processing and disposal is eliminated. This also leads to reduced cost of instrumentation, which is lower than that of conventional equipment even if all parts coming in contact with the product are made of special steel. Lastly, a better quality product is obtained through extremely gentle drying and short residence time at high temperatures.

Further, it is possible to pass the cooled superheated steam through a cyclone separator and thus to separate residues of the protein concentrate.

An apparatus intended for the practice of the process described has a heat generator; a heat exchanger; and a dryer, which, according to the invention, is a spray dryer with a rotating plate or an atomizer for supplying the solution; a collector for the resulting protein concentrate; and an inlet and an outlet for the superheated steam. A cyclone separator with a collector may be connected to the outlet. Expediently, the cyclone separator is connected with the heat exchanger via a line and with the heat generator via a by-pass. The discharge of the product or of the blood meal from the collectors of the spray dryer or cyclone separator can be effected pneumatically or mechanically to a silo.

In the following, the invention will be explained with reference to an embodiment illustrated in the drawing.

BRIEF DESCRIPTION OF THE DRAWINGS

The single FIGURE shows schematically an apparatus for the continuous production of blood meal from animal blood.

DESCRIPTION OF THE PREFERRED EMBODIMENT

The apparatus shown in the drawing has a burner 1 with combustion chamber 2, and a heat exchanger 3 following the latter, from which the exhaust gases are drawn off with an exhaust fan 4 and forced into an exhaust gas flue 5. Flue 5 can be closed partially or entirely by a controllable shutoff valve 6, so that the exhaust gases can be returned to the combustion chamber 2 at least in part via a by-pass 7, which likewise contains a controllable shutoff valve 8, in order to cool the combustion chamber and to protect the heat exchanger.

The secondary circuit of the heat exchanger 3 is connected to a line 9, in which superheated steam is conveyed by a fan 10. Before entering the heat exchanger 3, a bypass 11 with a controllable shutoff valve 12 connects with line 9 and leads to the combustion chamber 2, so that the superheated steam conveyed by the fan 10 can be used at least in part for the thermal aftercombustion.

The superheated steam leaves the heat exchanger 3 at a temperature of about 400° C. and passes via a connection line 13 into a spray dryer 14, whose lower part is designated as a collector 15. In the zone of collector 15 an outlet 16 is provided, which leads to a cyclone separator 17, from which the superheated steam is drawn by a fan 10 via line 18.

From a tank 19 containing animal blood, via a suction line 20 and a system 21 for processing and comminution, the blood is drawn off by a pump 22 and conveyed via a nozzle (not shown) into the spray dryer 14, which includes a centrifugal atomizer comprising a rotating disk (not shown) in the center of which the blood is charged, so that it spreads under the action of the centrifugal force in an extremely thin layer and dissolves into droplets of a diameter less than 100 micron, which pass into the stream of superheated steam. This causes the liquid to evaporate, the blood dries and the superheated steam cools to about 200° C. The dried solids, the blood meal, precipitate and are collected in the collector 15, whence they are discharged by a bucket wheel conveyor 23 arranged at the bottom of the collector and moved on to a silo pneumatically or mechanically via a line 24.

The superheated steam, cooled during the drying process to about 200° C., passes through the outlet 16 and line 18 into the cyclone separator, 17, in which residues of the entrained solids are eliminated almost completely. The collected residues are collected in the lower portion of cyclone separator 17 and dischargec by a bucket wheel conveyor arranged there and transported to the silo via line 24. Then the superheated steam drawn from the cyclone separator 17 returns at least in part to the heat exchanger 3, in which it is heated to about 400° C. and returned to the process.

What we claim is:

1. A process for the continuous production of protein concentrate from an aqueous solution of blood, comprising the steps of:
   (A) discharging superheated steam at a temperature of about 400° C. into a dryer chamber having a centrifugal atomizer disposed therein;
   (B) delivering an aqueous blood solution onto the centrifugal atomizer, from which it is discharged in the form of a thin layer of minute droplets of a size smaller than 100 microns, the said droplets being discharged directly into the stream of superheated steam, which dries the droplets while the steam is cooled to about 200° C.;
   (C) collecting the dried blood at the bottom of the dryer chamber and removing it therefrom; and
   (D) delivering the cooled steam to a cyclone separator where entrained solids are removed before the steam is reheated for reuse.

* * * * *